United States Patent
Kim et al.

(10) Patent No.: US 11,121,383 B2
(45) Date of Patent: Sep. 14, 2021

(54) SEPARATOR FOR FUEL CELL AND FUEL CELL USING THE SAME

(71) Applicant: LG CHEM, LTD., Seoul (KR)

(72) Inventors: Bong Soo Kim, Daejeon (KR); Jee Hoon Jeong, Daejeon (KR); Kyung Mun Kang, Daejeon (KR); Jae Choon Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 71 days.

(21) Appl. No.: 16/314,120

(22) PCT Filed: Oct. 12, 2017

(86) PCT No.: PCT/KR2017/011212
§ 371 (c)(1),
(2) Date: Dec. 28, 2018

(87) PCT Pub. No.: WO2018/088701
PCT Pub. Date: May 17, 2018

(65) Prior Publication Data
US 2019/0229348 A1    Jul. 25, 2019

(30) Foreign Application Priority Data
Nov. 14, 2016 (KR) ......................... 10-2016-0151351
Mar. 16, 2017 (KR) ......................... 10-2017-0033061

(51) Int. Cl.
*H01M 8/0265* (2016.01)
*H01M 8/0263* (2016.01)

(52) U.S. Cl.
CPC ....... *H01M 8/0265* (2013.01); *H01M 8/0263* (2013.01); *Y02E 60/50* (2013.01)

(58) Field of Classification Search
CPC .... H01M 8/0265; H01M 8/0263; Y02E 60/50
See application file for complete search history.

(56) References Cited

U.S. PATENT DOCUMENTS

2005/0266294 A1    12/2005 An et al.
2007/0298308 A1    12/2007 Yamamoto et al.
(Continued)

FOREIGN PATENT DOCUMENTS

CN    2885019 Y    1/2007
CN    133541391 C    9/2009
(Continued)

OTHER PUBLICATIONS

European Search Report for Appl. No. 17868565.7 dated Ju. 8, 2019.
(Continued)

*Primary Examiner* — Nicholas P D'Aniello
(74) *Attorney, Agent, or Firm* — Birch, Stewart, Kolasch & Birch, LLP

(57) ABSTRACT

A separator for a fuel cell having a flow channel including a transverse channel and a longitudinal channel formed therein, the transverse channel having a pair of opposed side walls, and a first pattern and a second pattern alternately spaced and arranged in the transverse channel is provided. Each of the first pattern and the second pattern is a column-shaped three-dimensional structure having a polygonal transverse section. The first pattern and the second pattern are arranged in the transverse channel so as to have a shape of the transverse sections being rotated 180° relative to each other. First spacing distances from each of the first pattern and the second pattern to a first side wall of the pair of opposed side walls of the transverse channel are different.

3 Claims, 17 Drawing Sheets

(56) References Cited

U.S. PATENT DOCUMENTS

| | | | | |
|---|---|---|---|---|
| 2007/0298311 | A1* | 12/2007 | Zeng | H01M 8/0265 |
| | | | | 429/434 |
| 2008/0318114 | A1 | 12/2008 | Lee et al. | |
| 2009/0162731 | A1* | 6/2009 | Gaudillat | H01M 8/2483 |
| | | | | 429/457 |
| 2010/0086819 | A1* | 4/2010 | Gemba | H01M 8/026 |
| | | | | 429/454 |
| 2012/0231373 | A1 | 9/2012 | Kusakabe et al. | |
| 2015/0180052 | A1* | 6/2015 | Leger | H01M 8/1011 |
| | | | | 429/457 |
| 2016/0028094 | A1* | 1/2016 | Son | H01M 8/026 |
| | | | | 429/482 |

FOREIGN PATENT DOCUMENTS

| | | |
|---|---|---|
| CN | 101847730 A | 9/2010 |
| CN | 104813528 A | 7/2015 |
| CN | 105742681 A | 7/2016 |
| DE | 10 2013 217 596 A1 | 3/2015 |
| JP | 62-76260 A | 4/1987 |
| JP | 8-185873 A | 7/1996 |
| JP | 2005-158611 A | 6/2005 |
| JP | 2005-340210 A | 12/2005 |
| JP | 2007-220686 A | 8/2007 |
| KR | 10-2010-0082501 A | 7/2010 |
| KR | 10-1060275 B1 | 8/2011 |
| KR | 10-1162667 B1 | 7/2012 |
| KR | 10-2012-0096029 A | 8/2012 |
| KR | 10-2014-0078904 A | 6/2014 |
| KR | 10-2015-0134583 A | 12/2015 |

OTHER PUBLICATIONS

International Search Report (PCT/ISA/210) issued in PCT/KR2017/011212, dated Jan. 22, 2018.
European Office Action for European Application No. 17868565.7, dated Sep. 23, 2020.
Chinese Office Action and Search Report for Chinese Application No. 201780045885.3, dated Apr. 28, 2021, with English translation of the Office Action.

* cited by examiner

[Figure 1]
Related Art
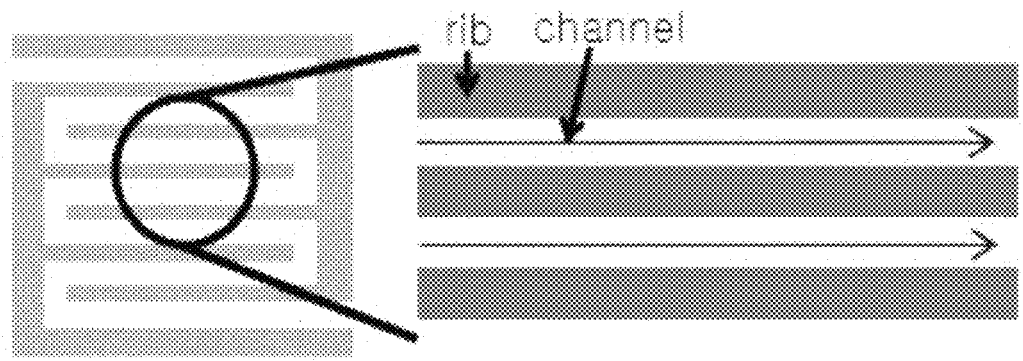
[Figure 2]
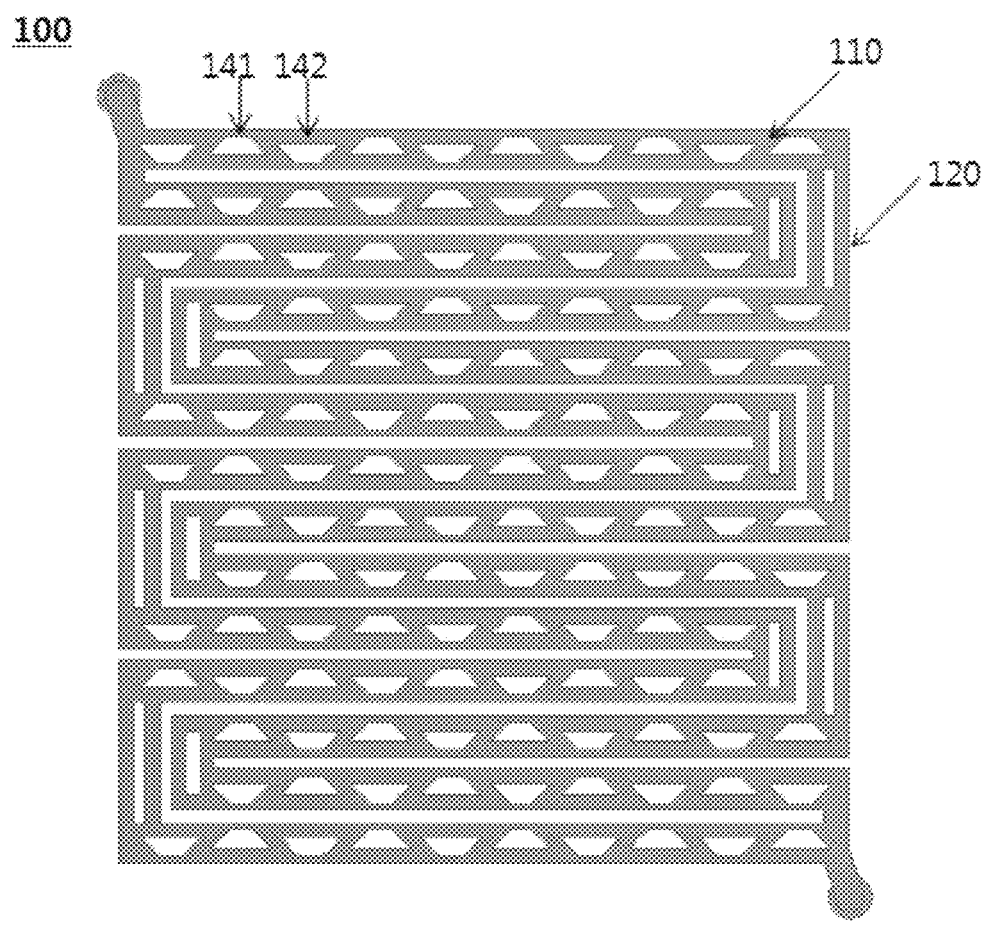

[Figure 3]
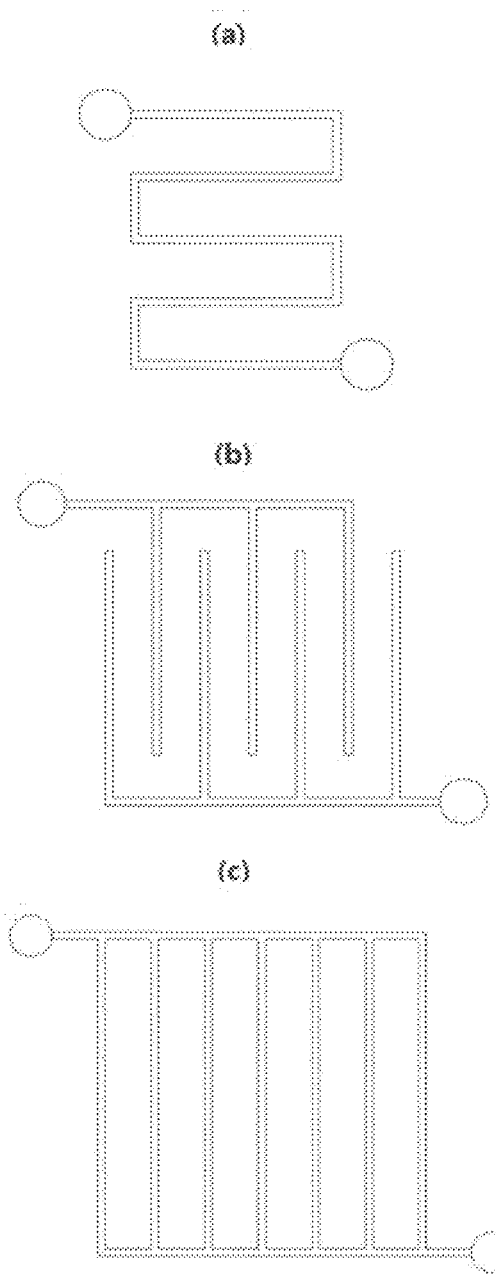
[Figure 4]
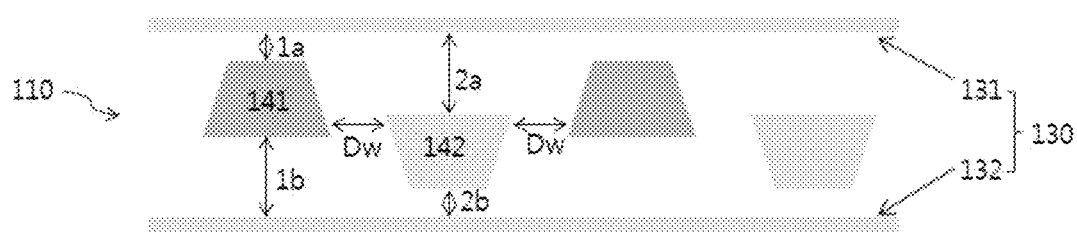

[Figure 5]
(a)
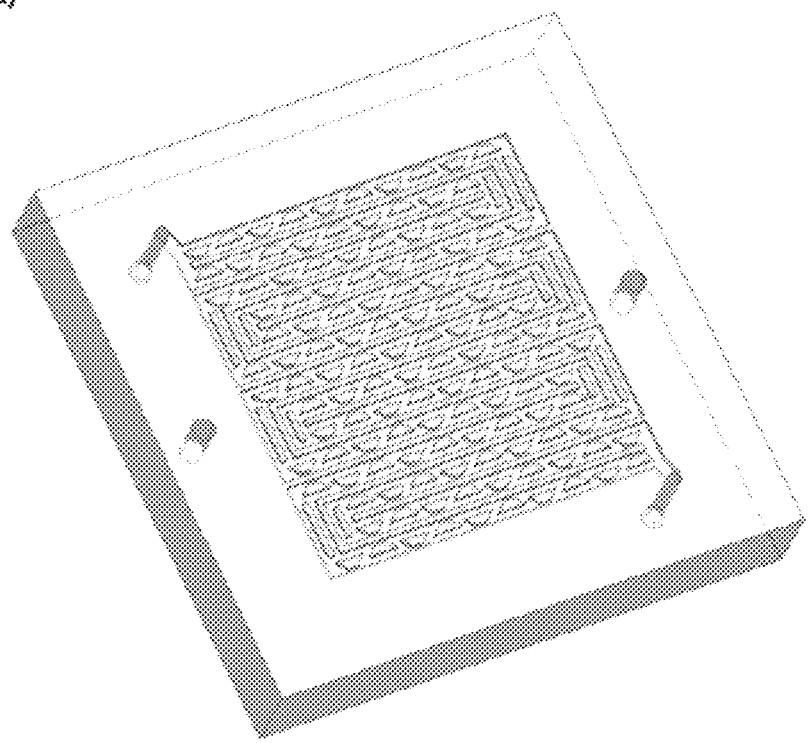
(b)
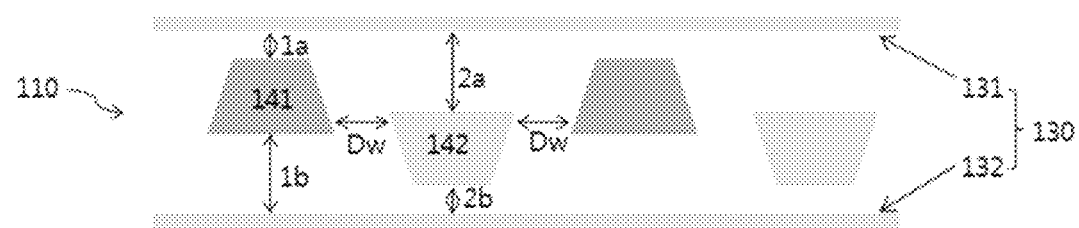

[Figure 6]
(a)
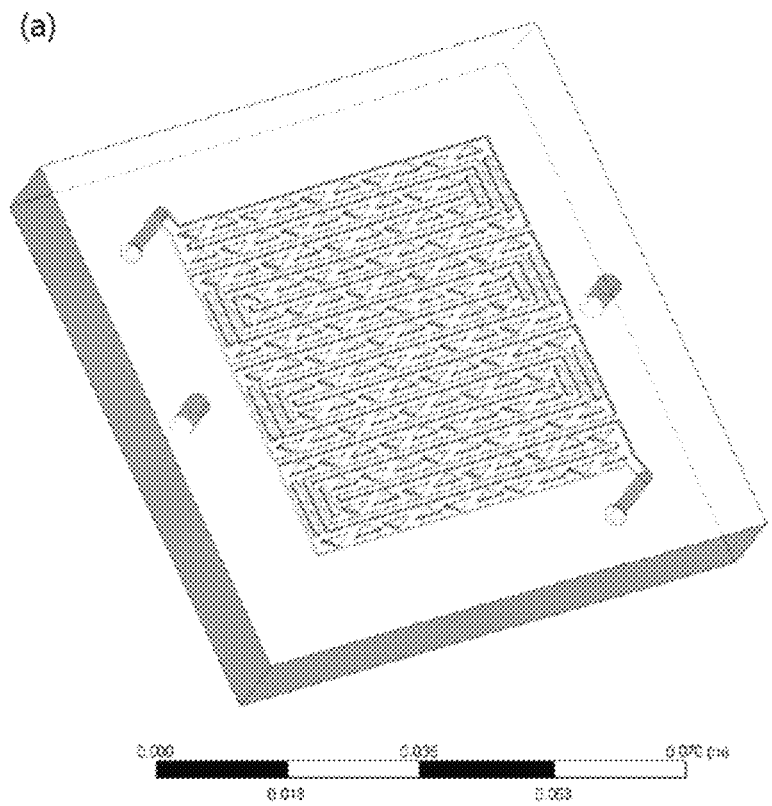
(b)
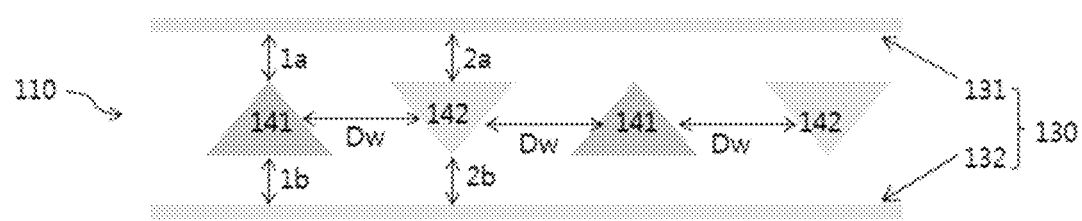

[Figure 7]
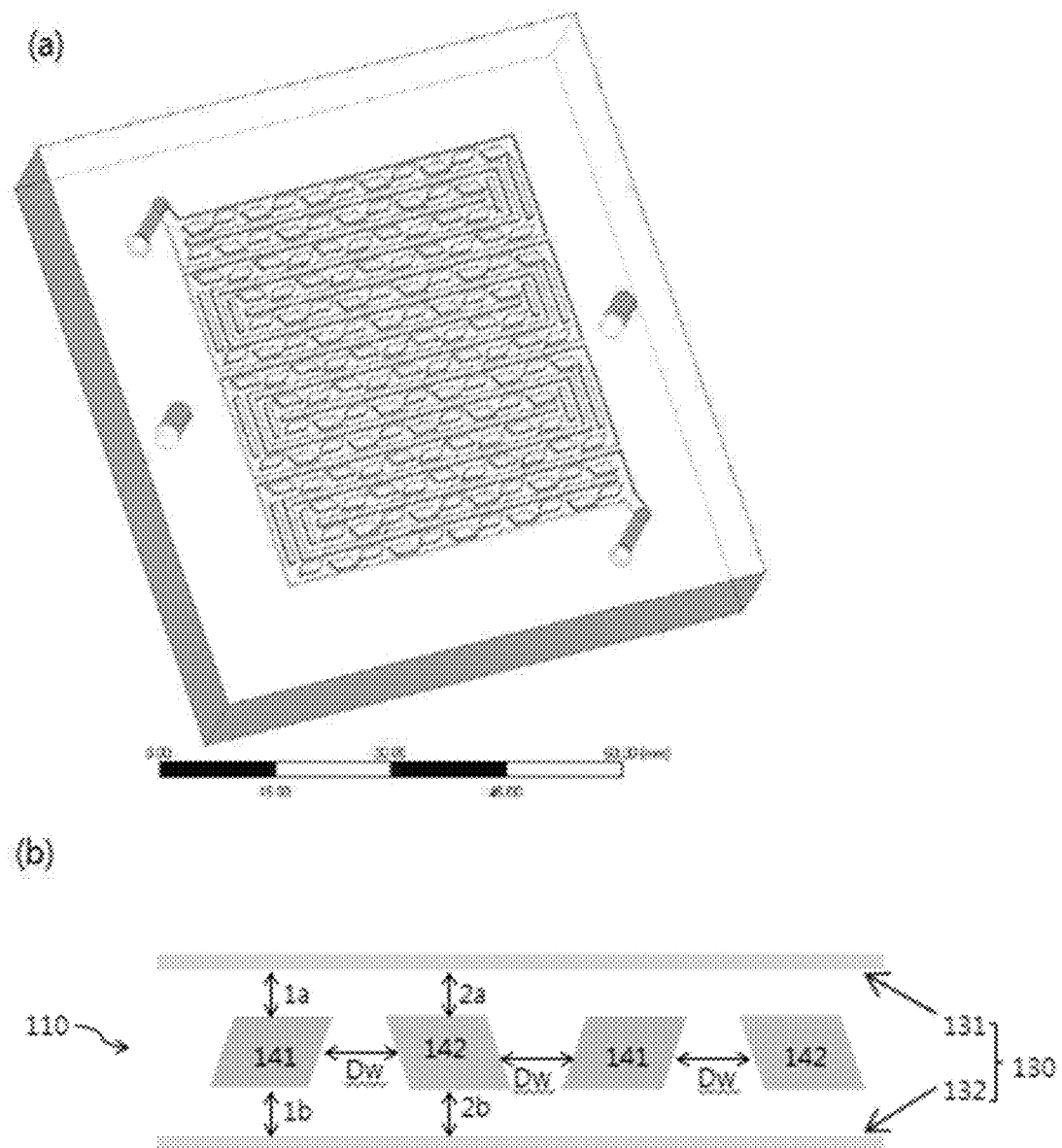

[Figure 8]
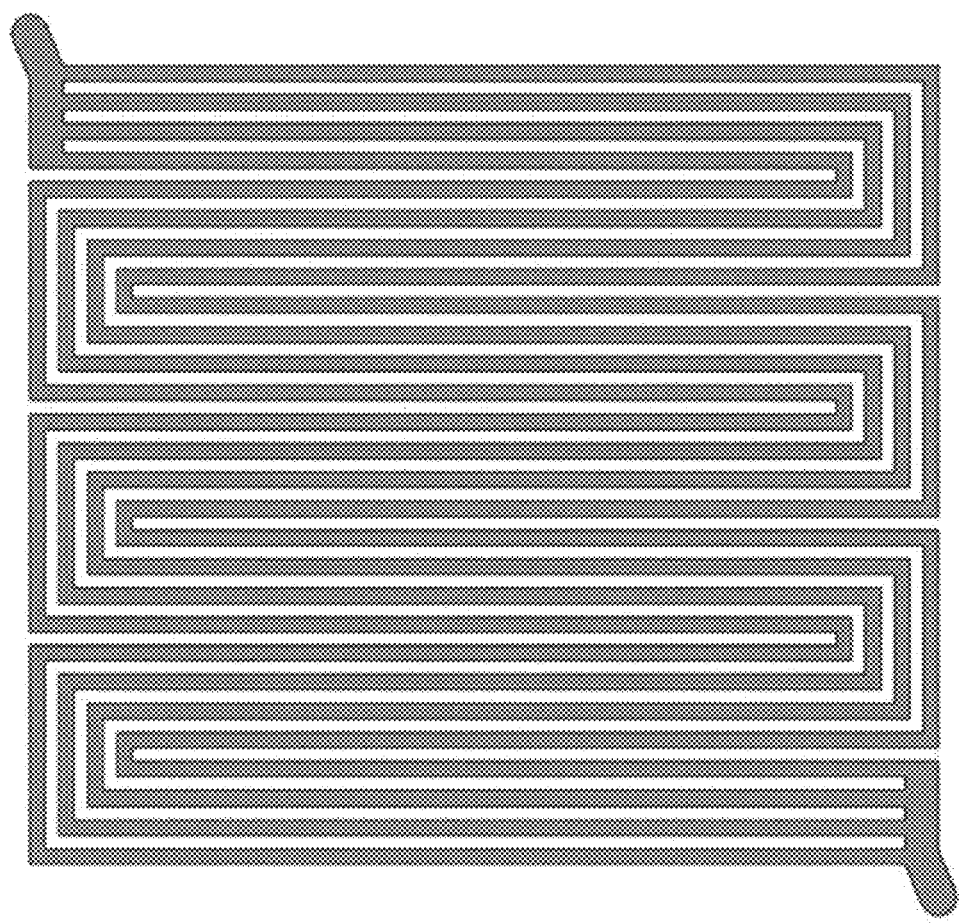

[Figure 9]
(a)
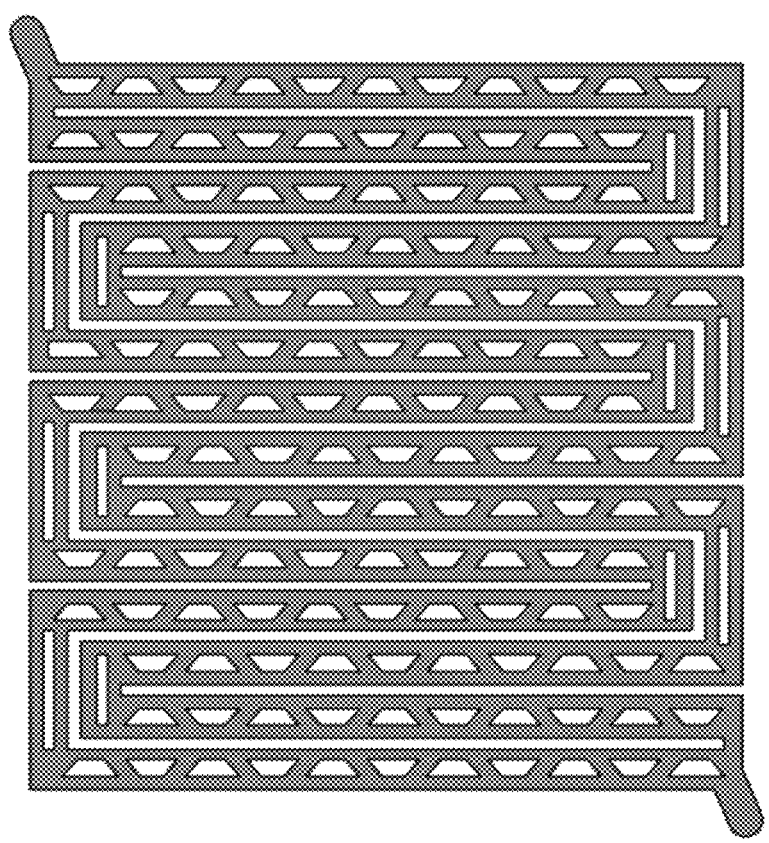
(b)
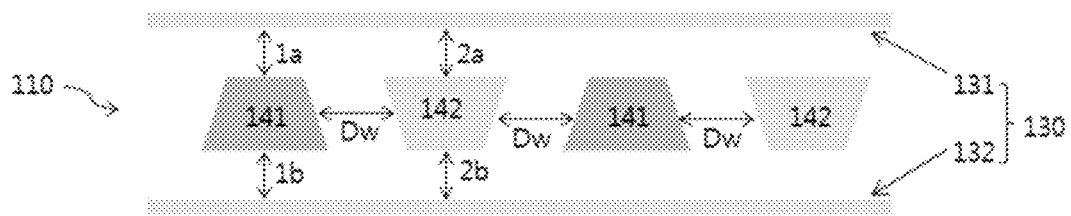

[Figure 10a]
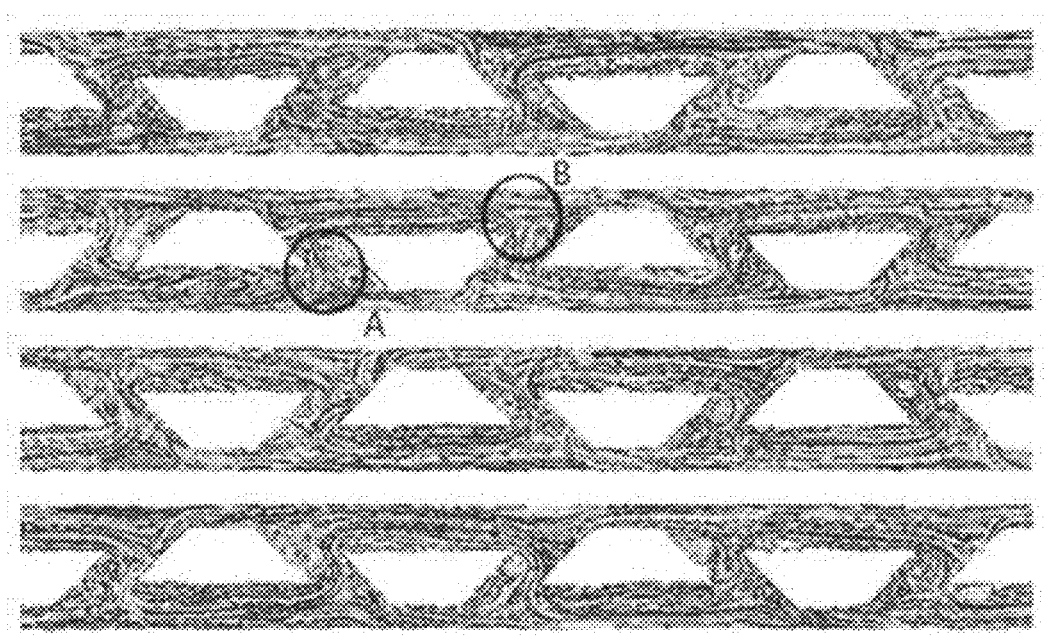

[Figure 10b]
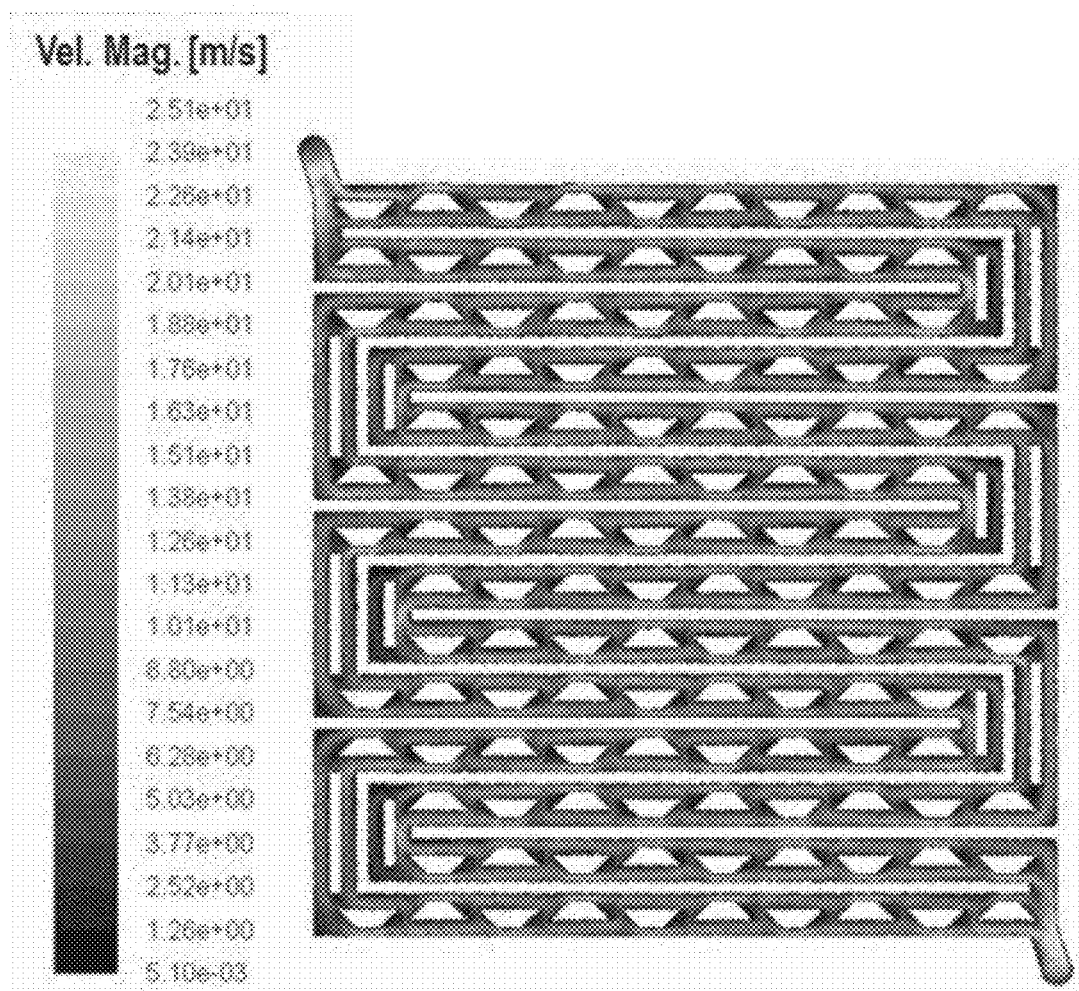

[Figure 10c]
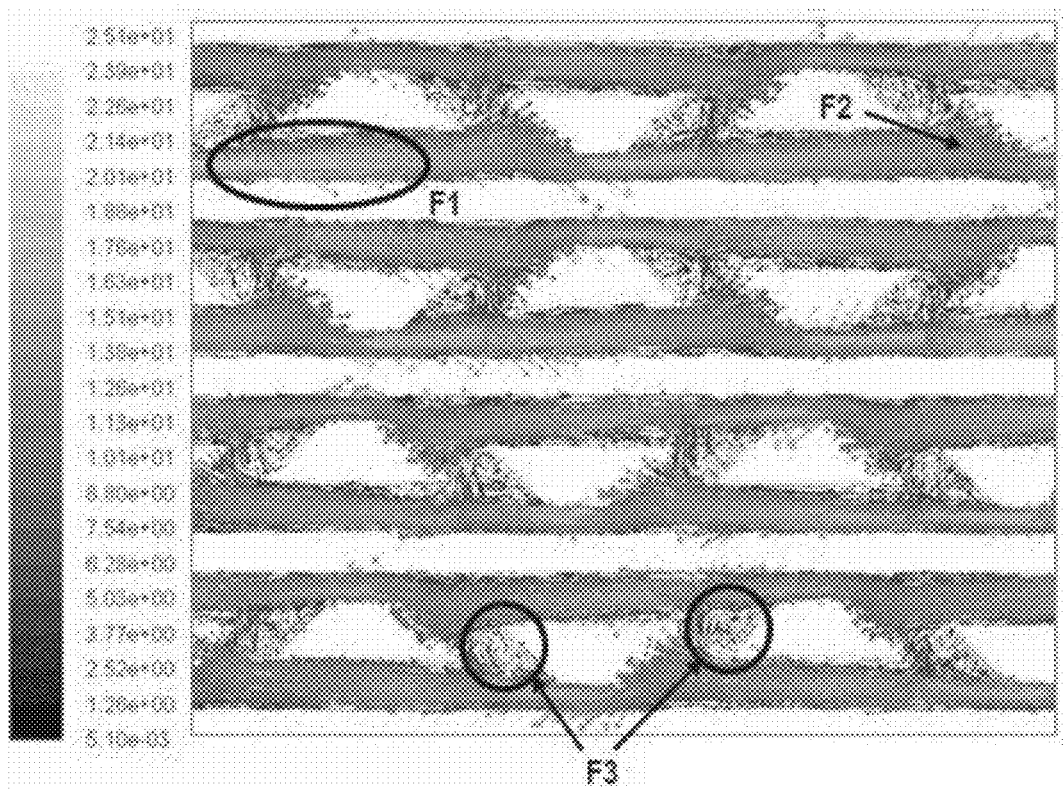

[Figure 11a]
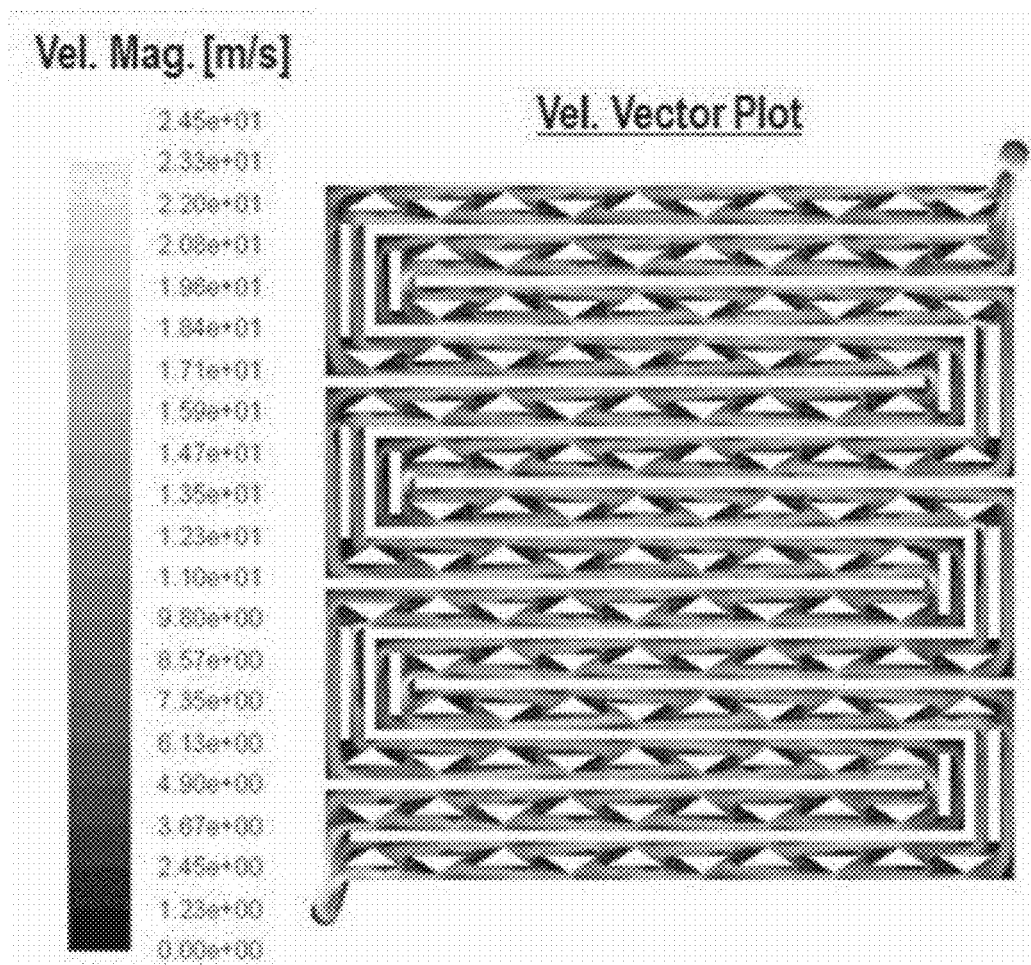

[Figure 11b]
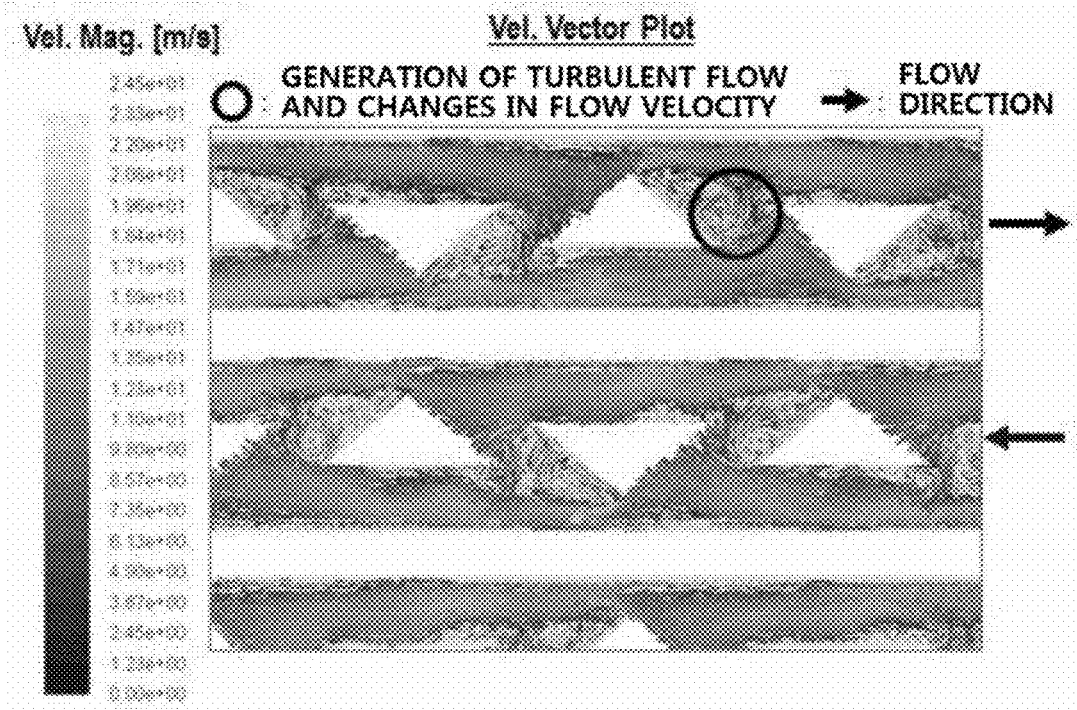

[Figure 12a]
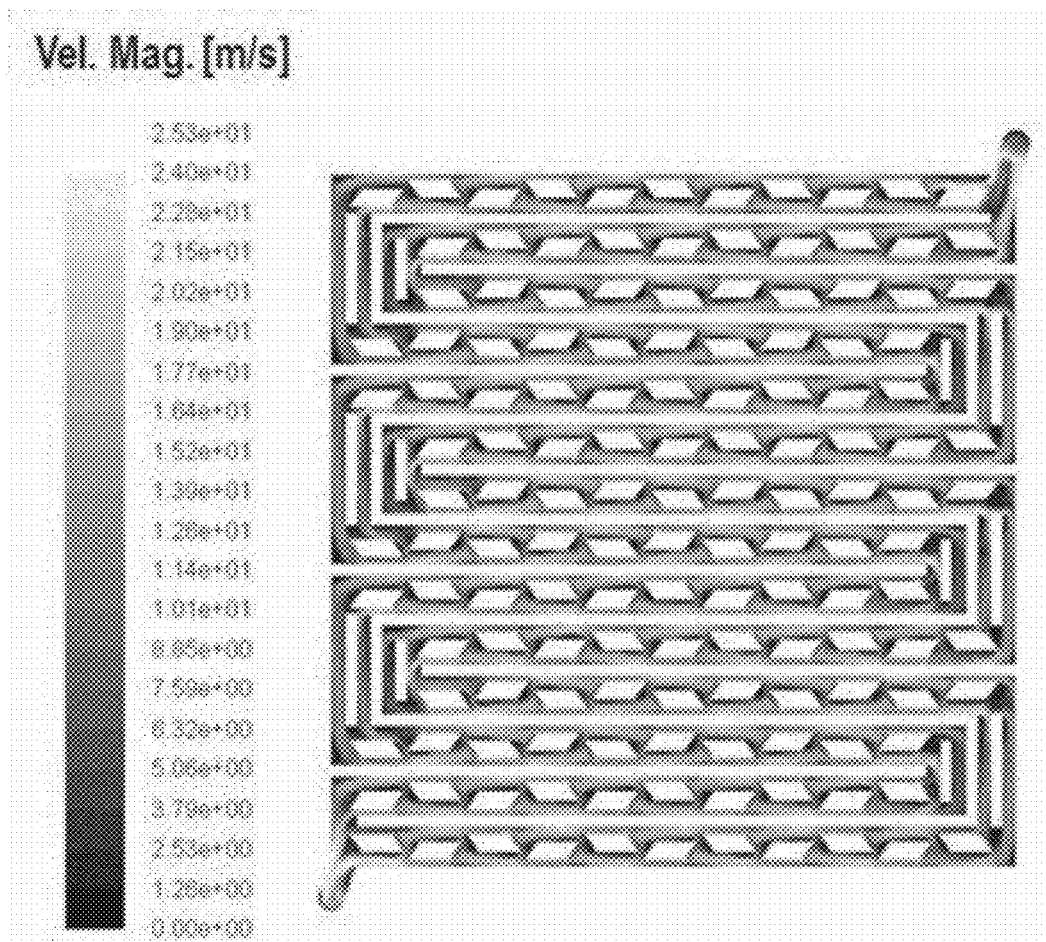

[Figure 12b]
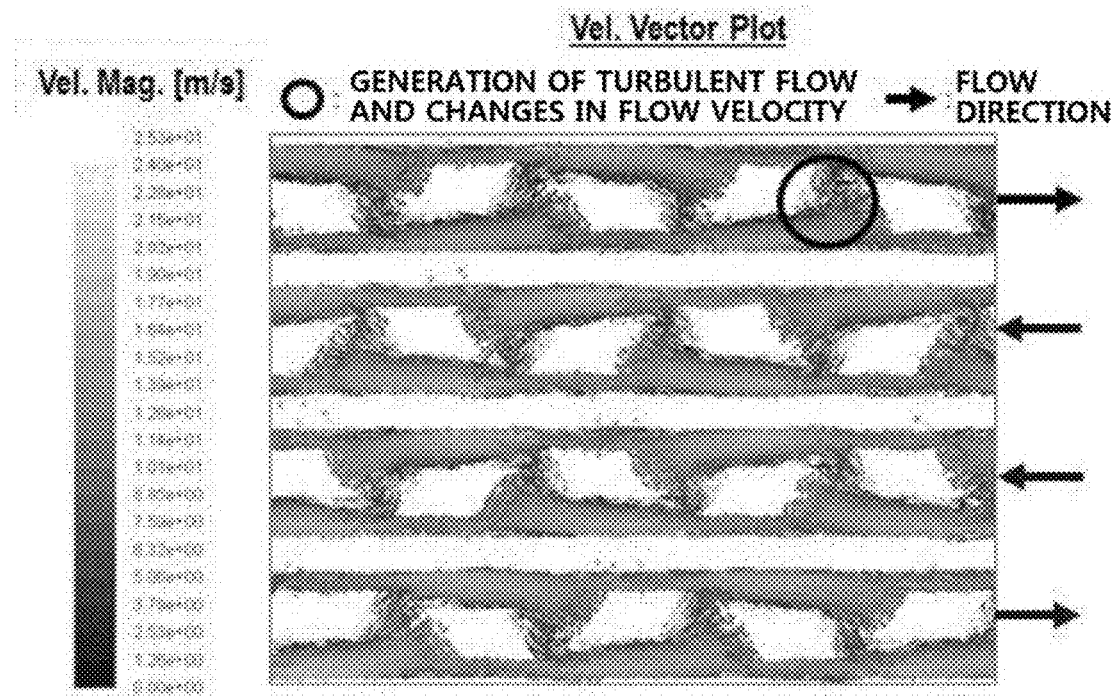

[Figure 13]
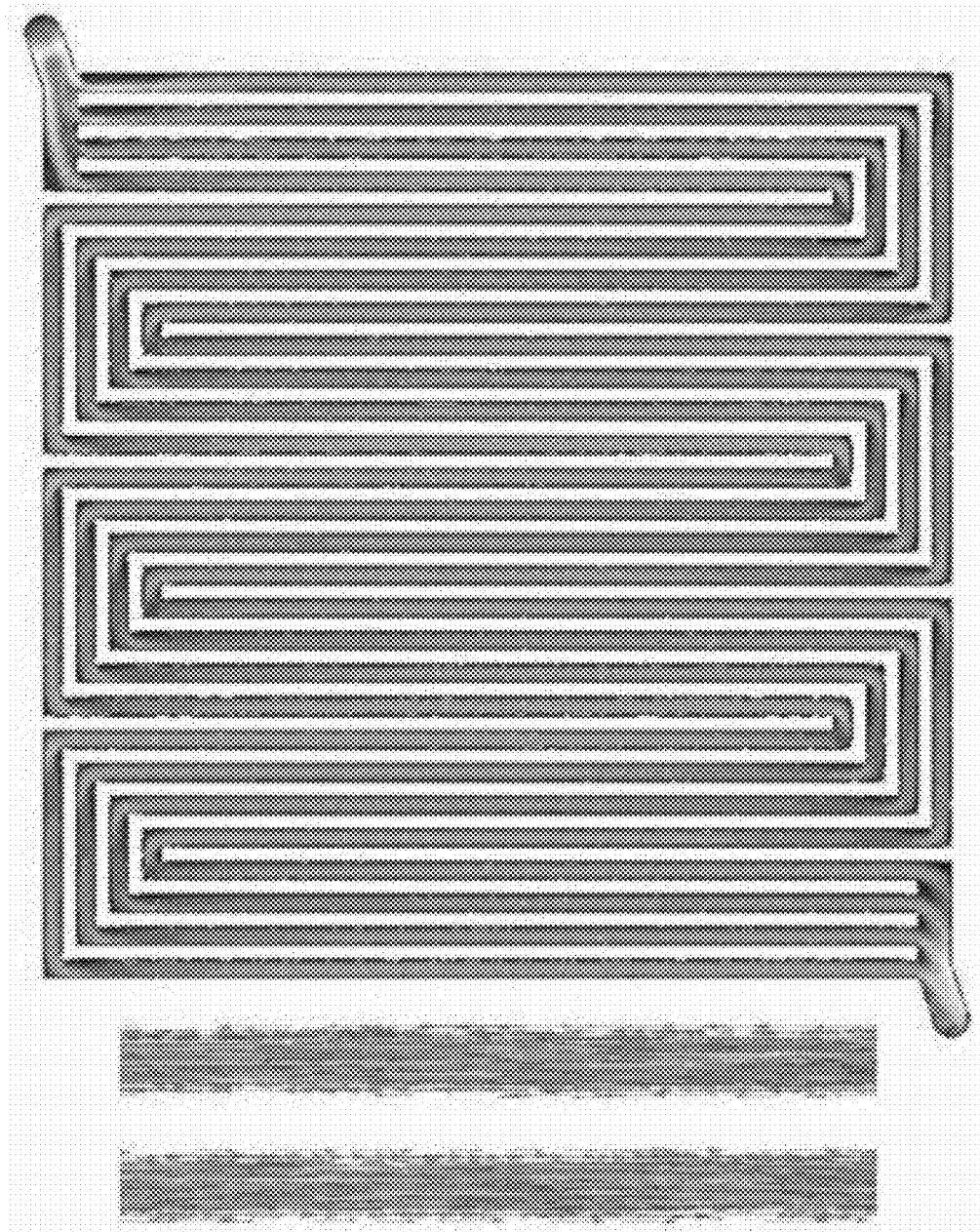

[Figure 14]
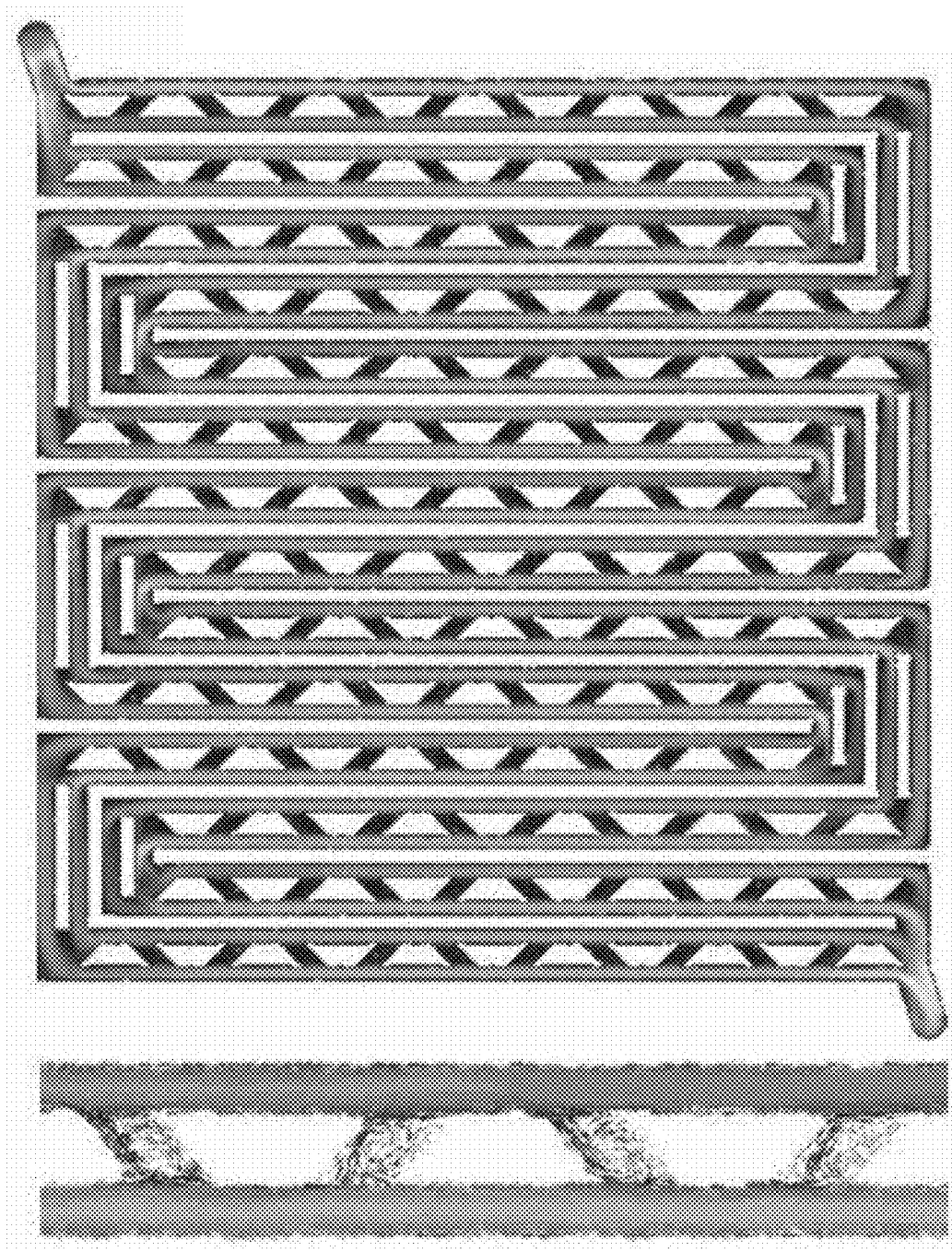

[Figure 15]
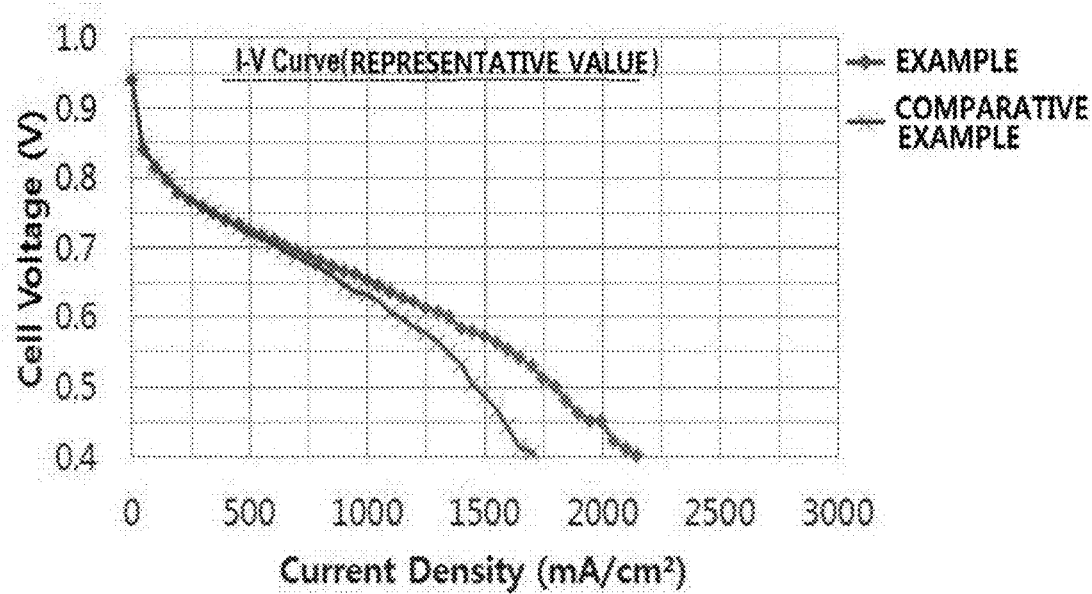

SEPARATOR FOR FUEL CELL AND FUEL CELL USING THE SAME

TECHNICAL FIELD

This application claims priority to and the benefits of Korean Patent Application No. 10-2016-0151351, filed with the Korean Intellectual Property Office on Nov. 14, 2016, and Korean Patent Application No. 10-2017-0033061, filed with the Korean Intellectual Property Office on Mar. 16, 2017, the entire contents of which are incorporated herein by reference.

The present invention relates to a separator for a fuel cell capable of increasing fuel cell efficiency through modifications in the shape of a flow channel formed in the separator for a fuel cell, and a fuel cell using the same.

BACKGROUND ART

A fuel cell is a power generator converting chemical energy of fuel directly to electric energy using an electrochemical reaction, and has a very wide scope of application from small to large scale systems due to its higher energy efficiency compared to existing combustion engines, and no pollutant emission. In other words, a fuel cell is a cutting-edge power generator highly anticipated in terms power system operation in that it is not, in theory, subject to thermodynamic restriction (Carnot efficiency) a heat engine has, and thereby has higher power generating efficiency compared to existing power generators, has almost no environmental problems as a pollution-free and no-noise device, may be manufactured in various capacity, and is readily installed in the areas of electric power demands and thereby is capable of saving costs for transmission and transformation of electric power.

A basic concept of a fuel cell may be explained as a use of electrons produced through a reaction of hydrogen and oxygen. Hydrogen passes through a fuel electrode and oxygen passes through an air electrode. Hydrogen electrochemically reacts with oxygen to generate electricity in the electrode while producing water. Direct current power is generated while electrons pass through an electrolyte, and heat is produced concomitantly. A direct current may be used as a power of a direct current motor or is used after being converted to an alternating current using an inverter. Heat generated in a fuel cell may produce steam for reforming or may be used as heat for air conditioning and heating, and when not used, is emitted as exhaust heat. As hydrogen, a fuel of a fuel cell, pure hydrogen may be used, or hydrogen produced through a process of so-called reforming using hydrocarbon such as methane or ethanol is used. Pure hydrogen may increase efficiency of a fuel cell, but has a problem of increasing cost and weight caused by oxygen storage. Accordingly, air is directly used sometimes since oxygen is much included in the air, although efficiency is somewhat reduced.

A separator of such a fuel cell has functions of maintaining fuel cell form, migrating electrons, and supplying gas. As a material of the separator, materials such as graphite or metals having electrical conductivity are used for form maintaining and electron migration, however, when using nonconductors, materials having electrical conductivity are coated to be used. A gas flow channel formed in a part of the separator is a path through which reaction gas flows, and through this gas flow channel, gas is supplied to an electrode of an electrolyte-electrode assembly located between two separators to produce an electrochemical reaction and generate electricity.

Accordingly, a separator for a fuel cell needs to be stable under both an air electrode oxidation atmosphere and a fuel electrode reduction atmosphere of a fuel cell, needs to be dense in order to prevent mixing of each fuel gas, and needs to have sufficient electrical conductivity.

In addition, a gas-flowing flow channel needs to be formed in a separator for a fuel cell, and herein, a depth, a width and a pattern of the gas flow channel of the separator are very important in facilitating gas flow.

As illustrated in FIG. 1, a linear type has been mostly used as a flow channel form in existing separators, however, this has a problem in that a gas flow occurs without circulation due to the generation of laminar flow, and there are great quantities of fuel flowing out without participating in the reaction. This problem has been mitigated by making a circulation cycle reusing the used fuel, however, this has a problem in that separate equipment and costs are required in order to provide the circulation cycle for fuel reuse.

In view of the above, studies for improving efficiency and performance of a fuel cell by improving a structure of a flow channel formed in a separator for a fuel cell have been consistently progressed.

For example, a separator having a pattern formed in a flow channel formed in the separator, and capable of controlling a fluid concentration by adjusting a distance of each pattern (Patent Document 001), and a separator for a fuel cell forming an island-type pattern at the back of a flow channel enabling vortex formation when a fluid passes through (Patent Document 002) have been developed, however, as requirements on fuel cell efficiency and performance have been higher, more precise structural improvements on a flow channel of a separator for a fuel cell have been required.

PRIOR ART DOCUMENTS

Patent Documents (Patent Document 1) Korean Patent Application Laid-Open Publication No. 2014-0078904, "Solid oxide fuel cell having longitudinal channel and transverse channel"

(Patent Document 2) Korean Patent Application Laid-Open Publication No. 2010-0082501, "Separator for a fuel cell having improved flow channel structure and fuel cell using the same"

DISCLOSURE

Technical Problem

As a result of extensive studies in view of the above, the inventors of the present invention have identified that, when an island-type pattern is formed in a flow channel—formed separator for a fuel cell, irregular flow velocity distribution and uniform flow quantity distribution of a fluid are induced inside the flow channel enhancing fuel cell efficiency, and preventing a membrane from being dried during low humidity operation, and have completed the present invention.

Accordingly, an aspect of the present invention provides a separator for a fuel cell having a flow channel structure capable of enhancing fuel cell efficiency by irregular flow velocity distribution and uniform flow quantity distribution inside the flow channel.

Another aspect of the present invention provides a fuel cell including a separator having an improved flow channel structure.

Technical Solution

According to an aspect of the present invention, there is provided a separator for a fuel cell having a flow channel including a transverse channel and a longitudinal channel formed therein, the separator including a first pattern and a second pattern alternately spaced and arranged in the transverse channel, wherein the first pattern and the second pattern are a column-shaped three-dimensional structure having a polygonal transverse section, the first pattern and the second pattern are arranged so as to have a shape of the transverse sections being 180° rotated to each other, and spacing distances from each of the first pattern and the second pattern to a side wall of the transverse channel are different.

Herein, the first pattern has a different spacing distance from each of the both side walls of the transverse channel, and the second pattern has a different spacing distance from each of the both side walls of the transverse channel.

The polygon may be one or more types selected from among a trapezoid, a triangle, a parallelogram, a quadrangle, a pentagon and a hexagon.

According to another aspect of the present invention, there is provided a fuel cell including the separator.

Advantageous Effects

By improving a flow channel structure due to an arrangement of a pattern formed on a separator for a fuel cell according to the present invention, a flow quantity is uniformly maintained while flow velocity is irregularly distributed in the overall flow channel, and as a result, fuel cell performance and efficiency can be enhanced.

In other words, by flow channels having a wide cross-sectional area and flow channels having a narrow cross-sectional area being distributed together, a pressure increases at a spot entering from the flow channel having a wide cross-sectional area to the flow channel having a narrow cross-sectional area increasing fuel cell efficiency, and a turbulent flow is generated at a spot entering from the flow channel having a narrow cross-sectional area to the flow channel having a wide cross-sectional area enabling a fuel concentration to be uniformly mixed and thereby enhancing performance.

In addition, when a pattern formed inside the flow channel has a column-shaped three-dimensional structure with a trapezoidal transverse section, water drops that may be stagnant due to a low flow velocity in the flow channel having a wide cross-sectional area are discharged through the wide flow channel while taking an inclined plane of the trapezoid and meeting a high flow velocity, and some are formed in the flow channel, and therefore, drying of a membrane may be prevented during low humidity operation of a fuel cell.

DESCRIPTION OF DRAWINGS

FIG. 1 is a mimetic diagram of a flow channel formed in a separator for a fuel cell according to an existing technology.

FIG. 2 is a mimetic diagram of a flow channel formed in a separator for a fuel cell according to the present invention.

FIG. 3 is a mimetic diagram illustrating forms of a flow channel that may be formed in a separator for a fuel cell according to the present invention.

FIG. 4 is a mimetic diagram illustrating an arranged form of a pattern inside a transverse channel of a flow channel in a separator for a fuel cell according to the present invention.

FIG. 5 is a mimetic diagram of a flow channel formed in a separator according to Example 1, and shows a perspective view of the separator for a fuel cell (a) and a mimetic diagram of the flow channel (b) when first and second patterns have a column shape having a trapezoidal transverse section.

FIG. 6 is a mimetic diagram of a flow channel formed in a separator according to Example 2, and shows a perspective view of the separator for a fuel cell (a) and a mimetic diagram of the flow channel (b) when first and second patterns have a column shape having a triangular transverse section.

FIG. 7 is a mimetic diagram of a flow channel formed in a separator according to Example 3, and shows a perspective view of the separator for a fuel cell (a) and a mimetic diagram of the flow channel (b) when first and second patterns have a column shape having a parallelogrammic transverse section.

FIG. 8 is a mimetic diagram of a flow channel formed in a separator according to Comparative Example 1.

FIG. 9 is a mimetic diagram of a flow channel formed in a separator according to Comparative Example 2.

FIGS. 10a to 10c show CFD analysis results on a flow channel formed in a separator for a fuel cell according to Example 1.

FIGS. 11a and 11b show computational fluid dynamics (CFD) analysis results on a flow channel formed in a separator for a fuel cell according to Example 2.

FIGS. 12a and 12b show CFD analysis results on a flow channel formed in a separator for a fuel cell according to Example 3.

FIG. 13 shows CFD analysis results on a flow channel formed in a separator for a fuel cell according to Comparative Example 1.

FIG. 14 shows CFD analysis results on a flow channel formed in a separator for a fuel cell according to Comparative Example 2.

FIG. 15 is a graph representing correlation between current density and cell voltage of a separator for a fuel cell of Example 1 and Comparative Example 1.

BEST MODE

Hereinafter, the present invention will be described in more detail in order to illuminate the present invention.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

The term 'transverse channel' used in the present specification means a linear flow channel formed in a transverse direction in a flow channel, and the term 'longitudinal channel' means a linear flow channel formed in a longitudinal direction.

The term 'side wall' of a flow channel used in the present specification means a wall surface on both side surfaces of a linear flow channel.

Separator for Fuel Cell

FIG. 2 is a mimetic diagram of a flow channel formed in a separator for a fuel cell according to the present invention.

As illustrated in FIG. 2, the present invention relates to a separator for a fuel cell having a flow channel (100) including a transverse channel (110) and a longitudinal channel (120) formed therein, and the separator for a fuel cell includes a first pattern (141) and a second pattern (142) alternately spaced and arranged in the transverse channel (110), wherein the first pattern (141) and the second pattern (142) are a column-shaped three-dimensional structure having a polygonal transverse section, the first pattern (141) and the second pattern (142) are arranged so as to have a shape of the transverse sections being 180° rotated to each other, and spacing distances from each of the first pattern (141) and the second pattern (142) to a side wall of the transverse channel (110) are different.

FIG. 3 is a mimetic diagram illustrating forms of a flow channel that may be formed in a separator for a fuel cell according to the present invention.

The flow channel (100) of the separator for a fuel cell may have a form including a transverse channel (110) and a longitudinal channel (120), and specifically, may be one or more types selected from among a serpentine-type (a), an interdigitated-type (b) and a parallel-type (c).

Inside the transverse channel (110) of the flow channel (100), island-type first pattern (141) and second pattern (142) may be alternately arranged to be spaced at regular intervals.

In addition, inside the longitudinal channel (120), a column-shaped pattern having a rectangular transverse section may be formed.

The first pattern (141) and the second pattern (142) are a column-shaped three-dimensional structure having a polygonal transverse section, and the polygonal transverse section may be one or more types selected from among a trapezoid, a triangle, a quadrangle, a pentagon and a hexagon, and the polygonal transverse section is preferably a trapezoid considering irregular flow velocity distribution and uniform flow quantity distribution in the flow channel (100) caused by the first pattern (141) and the second pattern (142).

The width of such a polygon may be from 0.1 mm to 5 mm, and the height may be from 0.1 mm to 5 mm. When the width and the height are less than the lower limit, processing becomes impossible and cost-bearing for manufacturing a practically usable fuel cell may increase, and when the size is greater than the upper limit, the large polygon blocks efficient fuel transfer between the flow channel and an electrolyte membrane reducing practicality.

FIG. 4 is a mimetic diagram illustrating an arranged form of the pattern in the transverse channel of the flow channel in the separator for a fuel cell according to the present invention, and is a case where the transverse section of the pattern is a trapezoid.

As illustrated in 4, the first pattern (141) and the second pattern (142) may be arranged inside the flow channel (100) to be spaced at a spacing distance (Dw) between the patterns at regular intervals.

The first pattern (141) and the second pattern (142) are three-dimensional structures having the same size and shape, but may be arranged to have a shape 180° rotated to each other when arranged in the flow channel (100), and by alternately arranging the polygons as described above to have a shape 180° rotated to each other, irregular flow velocity distribution and constant flow quantity distribution may be obtained, which resultantly provides a separator for a fuel cell capable of enhancing fuel cell performance and efficiency.

The first pattern (141) and the second pattern (142) may each be arranged in the transverse channel (110) to be space from both side walls (130) of the transverse channel (110). Herein, the both side walls (130) of the transverse channel (110) are each referred to as a first side wall (131) and a second side wall (132).

In the first pattern (141), the spacing distance between the first pattern (141) and the first side wall (131) of the transverse channel (110) is referred to as a first pattern spacing distance 1 (1a), and the spacing distance between the first pattern (141) and the second side wall (132) of the flow channel (100) is referred to as a first pattern spacing distance 2 (1b). Herein, the spacing distance means a linear distance that is the shortest distance between the pattern and the side wall (130) of the transverse channel (110) of the flow channel (100).

In addition, in the second pattern (142), the spacing distance between the second pattern (142) and a first wall surface (101w) of the flow channel (100) is referred to as a second pattern spacing distance 1 (2a), and the spacing distance between the second pattern (142) and the second side wall (132) of the flow channel (100) is referred to as a second pattern spacing distance 2 (2b).

In the first pattern (141), the first pattern spacing distance 1 (1a) and the first pattern spacing distance 2 (1b) are different, and in the second pattern (142), the second pattern spacing distance 1 (2a) and the second pattern spacing distance 2 (2b) are different.

By the spacing distances (1a, 1b) to the both side walls (131, 132) of the transverse channel (130) being different in the first pattern (141), the first pattern (141) is not positioned at the center of the transverse channel (130) of the flow channel (100), and accordingly, the cross-sectional areas of the two flow channels formed on both sides of the first pattern (141) become different making a flow velocity different.

By the spacing distances (2a, 2b) to the both side walls (131, 132) of the transverse channel (130) being different in the second pattern (142), the second pattern (141) is not positioned at the center of the flow channel (100), and accordingly, the cross-sectional areas of the two flow channels formed on both sides of the second pattern (142) become different making a flow velocity different.

In addition, the first pattern spacing distance 1 (1a) and the second pattern spacing distance 1 (2a), the distances from the first pattern (141) and the second pattern (142), respectively, to the first side wall (131) of the flow channel (100), are different, and the first pattern spacing distance 2 (1b) and the second pattern spacing distance 2 (2b), the distances spaced from the second side wall (132), are also different.

By the distances of the first pattern (141) and the second pattern (142) from the first side wall (131) of the transverse channel (130) of the flow channel (100) being different, a flow channel having a different cross-sectional area may be formed.

For example, at a spot where a fluid flows from a flow channel having a large cross-sectional area to a flow channel having a small cross-sectional area, a bottleneck area where a local pressure is produced and a turbulent flow is generated is formed, and due to the high pressure in the bottleneck area, fuel cell efficiency may be enhanced.

On the contrary, at a spot where a fluid flows from a flow channel having a small cross-sectional area to a flow channel having a large cross-sectional area, a joining region where a turbulent flow is generated due to a difference in the flow direction of the fluid flowing, and the turbulent flow may perform a role of mixing so as to have a uniform fuel concentration.

In addition, when water is produced while the fluid flows, most of the water is discharged to the flow channel having a large cross-sectional area, and some are formed in the small area, and drying of a separator may be prevented during low humidity operation of a fuel cell.

The present invention also provides a fuel cell including the separator for a fuel cell.

The fuel cell including the separator for a fuel cell has a uniform flow quantity while having nonuniform flow velocity distribution in the overall flow channel by a pattern shape of the flow channel formed in the separator, and therefore, may have enhanced efficiency and performance, and may prevent dryness even when operated under a low humidity condition.

Hereinafter, preferred examples will be provided in order to illuminate the present invention, however, the following examples are for illustrative purposes only, and it will be obvious to those skilled in the art that various changes and modifications may be made within the scope and technological ideas of the present invention, and such changes and modifications also belong to the scope of the attached claims.

Specific shapes and sizes of flow channels formed in separators for a fuel cell of the following examples and comparative examples are as listed in Table 1.

TABLE 1

| | Example 1 | Example 2 | Example 3 | Comparative Example 1 | Comparative Example 2 |
|---|---|---|---|---|---|
| Flow Channel | Serpentine-type | Serpentine-type | Serpentine-type | Serpentine-type | Serpentine-type |
| Presence of Pattern inside Flow Channel | Yes | Yes | Yes | No | Yes |
| Transverse Section of Pattern | Trapezoid | Triangle | Parallelogram | — | Trapezoid |
| Shapes of First and Second Patterns | Transverse Section of Pattern Is Same as Shape 180° Rotated to Each Other | Transverse Section of Pattern Is Same as Shape 180° Rotated to Each Other | Transverse Section of Pattern Is Same as Shape 180° Rotated to Each Other | — | Transverse Section of Pattern Is Same as Shape 180° Rotated to Each other |
| First Pattern Spacing distance 1 (1a) | 500 μm | 500 μm | 500 μm | — | 750 μm |
| First Pattern Spacing distance 2 (1b) | 1000 μm | 1000 μm | 1000 μm | — | 750 μm |
| Second Pattern Spacing distance 1 (2a) | 1000 μm | 1000 μm | 1000 μm | — | 750 μm |
| Second Pattern Spacing distance 2 (2b) | 500 μm | 500 μm | 500 μm | — | 750 μm |
| Spacing distance (Dw) Between Patterns | 700 μm | 700 μm | 700 μm | — | 700 μm |

Example 1: Separator for Fuel Cell Having Column-Shaped Pattern with Trapezoidal Transverse Section Arranged at Regular Intervals in Center of Flow Channel As illustrated in FIG. 5, a separator for a fuel cell having a pattern formed in a flow channel was prepared, and (a) is a perspective view of the separator for a fuel cell, and (b) is a mimetic diagram of the flow channel formed in the separator.

In the separator for a fuel cell having a linear flow channel formed in a serpentine-type, a column-shaped pattern having a trapezoidal transverse section was arranged to be spaced at regular intervals in a transverse channel (110) of the flow channel (100), and adjacent two patterns, that is, a first pattern (141) and a second pattern (142) were arranged to have a shape of the transverse section being 180° rotated to each other.

As listed in Table 1, a first pattern spacing distance 1 (1a) and a first pattern spacing distance 2 (1b), the spacing distances from the first pattern (141) to a first side wall (131) and a second side wall (132) of the transverse channel (110) of the flow channel (100), were 500 μm and 1000 μm, respectively, and a second pattern spacing distance 1 (2a) and a second pattern spacing distance 2 (2b), the spacing distances from the second pattern (142) to a first side wall (131) and a second side wall (132) of the transverse channel (110) of the flow channel (100), were 1000 μm and 500 μm, respectively, and a spacing distance (Dw) between the adjacent two patterns was 700 μm.

Example 2: Separator for Fuel Cell Having Column-Shaped Pattern with Triangular Transverse Section Arranged at Regular Intervals in Center of Flow Channel A separator for a fuel cell having the same form as in Example 1 was prepared except that the pattern formed in the flow channel was triangular instead of trapezoidal.

FIG. 6 is a mimetic diagram of the flow channel formed in the separator according to Example 2, and shows a perspective view of the separator for a fuel cell (a) and a mimetic diagram of the flow channel (b) when the first and second patterns have a column shape having a triangular transverse section.

Example 3: Separator for Fuel Cell Having Column-Shaped Pattern with parallelogram Transverse Section Arranged at Regular Intervals in Center of Flow Channel A separator for a fuel cell having the same form as in Example 1 was prepared except that the pattern formed in the flow channel was parallelogrammic instead of trapezoidal.

FIG. 7 is a mimetic diagram of the flow channel formed in the separator according to Example 3, and shows a perspective view of the separator for a fuel cell (a) and a mimetic diagram of the flow channel (b) when the first and second patterns have a column shape having a parallelogrammic transverse section.

Comparative Example 1: Separator for Fuel Cell Having Linear Flow Channel Formed in Serpentine-Type As shown in FIG. 8, a separator for a fuel cell having a linear flow channel formed in a serpentine-type was prepared.

Comparative Example 2: Separator for Fuel Cell Having Column-Shaped Pattern with Trapezoidal Transverse Section Arranged at Regular Intervals in Center of Flow Channel As shown in FIG. 9, a separator for a fuel cell formed with a pattern arranged in the center of a flow channel was prepared, and (a) is a mimetic diagram of the separator for a fuel cell, and (b) is a mimetic diagram of the flow channel formed in the separator.

The separator for a fuel cell was a separator for a fuel cell including a flow channel (100) having a first pattern (141) and a second pattern (142) arranged to have the same shape as in Example 1, however, the first pattern (141) and the second pattern (142) were arranged to be in the center of the flow channel (100).

In other words, as described in Table 1, a first pattern spacing distance 1 (1a), a first pattern spacing distance 2 (1b), a second pattern spacing distance 1 (2a) and a second pattern spacing distance 2 (2b), spacing distances from the first pattern (141) and the second pattern (142) to a first side wall (131) and a second side wall (132) of the transverse channel (110) of the flow channel (100), were all the same as 750 μm, and a spacing distance (Dw) between the two adjacent patterns was 700 μm.

Experimental Example 1: Computational Fluid Dynamics (CFD) Analysis

A CFD analysis was performed on the separators for a fuel cell of Examples 1 to 3 and Comparative Example 1, and flow line form and flow velocity distribution depending on the flow channel form were analyzed.

FIGS. 10a to 10c show CFD analysis results on the flow channel formed in the separator for a fuel cell according to Example 1 of the present invention.

FIG. 10a shows flow quantity distribution in the flow channel formed in the separator for a fuel cell, and in the separator for a fuel cell according to Example 1, it can be seen that flow channels having different cross-sectional areas are formed due to the arrangement of the first and the second patterns in the flow channel, and vortexes are produced at the intersections (A, B) where the flow channels having different cross-sectional areas meet. As vortexes are produced in the flow channel, an effect of improving a flow property may be expected.

In addition, FIG. 10b shows flow velocity distribution in the flow channel formed in the separator for a fuel cell, and in the separator for a fuel cell according to Example 1, it can be seen that flow channels having different cross-sectional areas are formed due to the arrangement of the first and the second patterns in the flow channel, and nonuniform flow velocity distribution is obtained in the overall flow channel since a flow velocity is high in the flow channel having a small cross-sectional area and a flow velocity is low in the flow channel having a large cross-sectional area.

FIG. 10c shows flow velocity distribution in the flow channel formed in the separator for a fuel cell more specifically. A flow velocity appeared to be higher in the flow channel (F1) having a small cross-sectional area, and although a flow velocity was relatively slow in the flow channel (F2) having a large cross-sectional area, the flow velocity appeared to be high since the fluid flow was converged by the hypotenuse of the trapezoid of the patterns, and in order to have uniform flow quantity distribution in the overall flow channel, the patterns may be arranged so that parts having a high flow velocity alternately appear on both sides of the pattern. In addition, water drops that may be stagnant due to a low flow velocity in the flow channel (F3) formed between the patterns flow along the hypotenuse of the pattern having a trapezoidal transverse section due to gravity, and may be discharged when meeting a high flow velocity by quickly moving in a flow direction. In other words, when water is produced in the flow channel, most are discharged through a wide flow channel, and some are formed in a narrow flow channel, and therefore, drying of the separator may be prevented during low humidity operation of a fuel cell.

FIGS. 11a and 11b show CFD analysis results on the flow channel formed in the separator for a fuel cell according to Example 2.

When referring to FIGS. 11a and 11b, the triangular pattern of Example 2 had a relatively decreased individual pattern area compared to the trapezoidal pattern of Example 1, and the average flow velocity thereof tended to decrease in the overall flow channel. However, as in Example 1, it can be seen that flow channels having different cross-sectional areas are formed in the flow channel due to the arrangement of the triangular patterns, and vortexes are produced at the intersections where the flow channels having different cross-sectional areas meet due to a turbulent flow and changes in the flow velocity. As vortexes are produced in the flow channel, an effect of improving a flow property may be expected.

FIGS. 12a and 12b show CFD analysis results on the flow channel formed in the separator for a fuel cell according to Example 3.

When referring to FIGS. 12a and 12b, the parallelogrammic pattern of Example 3 had a relatively increased individual pattern area compared to the trapezoidal pattern of Example 1, and the average flow velocity thereof tended to increase in the overall flow channel. However, as in Example 1, it can be seen that flow channels having different cross-sectional areas are formed in the flow channel due to the arrangement of the parallelogrammic patterns, and vortexes are produced at the intersections where the flow channels having different cross-sectional areas meet due to a turbulent flow and changes in the flow velocity. As vortexes are produced in the flow channel, an effect of improving a flow property may be expected.

FIG. 13 shows CFD analysis results on the flow channel formed in the separator for a fuel cell according to Comparative Example 1, and FIG. 14 shows CFD analysis results on the flow channel formed in the separator for a fuel cell according to Comparative Example 2.

As shown in FIG. 13, it was seen that, in the linear flow channel formed in the separator for a fuel cell according to Comparative Example 1, the flow velocity was constant and no vortexes were produced in the overall flow channel.

In addition, as shown in FIG. 14, it was seen that, in the linear flow channel formed in the separator for a fuel cell according to Comparative Example 2, a laminar flow was developed in the flow channel formed on both sides of the patterns, and no changes were observed in the flow velocity on the same flow line, and as a result, no vortexes were produced.

Thus, according to the flow analysis on the separators for a fuel cell according to Example 1 to Example 3, it can be identified that, when a pattern is arranged in a flow channel so that the distance between the pattern and a wall surface of the flow channel is repeatedly different, that is, when flow channels having different cross-sectional areas are repeated, vortexes are produced when there is a hypotenuse inducing from a flow channel having a wide cross-sectional area to a flow channel having a small cross-sectional area, and an effect of improving a flow property may be expected.

Experimental Example 2: Correlation Between Current Density and Cell Voltage

For the separators for a fuel cell of Example 1 and Comparative Example 1, correlation between current density and cell voltage was measured.

FIG. 15 is a graph (I-V Curve) representing correlation between current density and cell voltage of the separator for a fuel cell of Example 1 and Comparative Example 1.

As shown in FIG. 15, it can be seen that, in the separators for a fuel cell of Example 1 and Comparative Example 1, a voltage decreases as current density increases. An increase in the difference between the amounts of voltage drop as current density increases is known to be caused from a mass transfer of oxygen and hydrogen when producing large quantities of currents.

Accordingly, it can be seen that a phenomenon of voltage drop caused by mass transfer is considerably improved in Example 1 compared to in Comparative Example 1.

The following Table 1 shows results of measuring current density at specific cell voltages, that is, 0.6 V and 0.7 V, for the separators for a fuel cell of Example 1 and Comparative Example 1.

TABLE 2

| Cell Voltage | Example 1 | Comparative Example 1 |
|---|---|---|
| OCV (Open-Circuit Voltage) | 0.94 V | 0.942 V |
| @ 0.6 V | 1,346 (mA/cm$^2$) | 1,134 (mA/cm$^2$) |
| @ 0.7 V | 678 (mA/cm$^2$) | 631 (mA/cm$^2$) |

As shown in Table 1, when the cell voltage was 0.6 V and 0.7 V, Example 1 had higher current quantities compared to Comparative Example 1, and it can be seen that Example 1 exhibits higher efficiency and output compared to Comparative Example 1 therefrom.

REFERENCE NUMERAL

1: Separator for Fuel Cell
100: Flow Channel
110: Transverse Channel
120: Longitudinal Channel
130: Side Wall
131: First Side Wall
132: Second Side Wall
140: Pattern
141: First Pattern
142: Second Pattern
1a: First Pattern Spacing distance 1
1b: First Pattern Spacing distance 2
2a: Second Pattern Spacing distance 1
2b: Second Pattern Spacing distance 2

The invention claimed is:

1. A separator for a fuel cell comprising:
   a flow channel including a transverse channel and a longitudinal channel formed therein, the transverse channel having a pair of opposed side walls; and
   a first pattern and a second pattern alternately spaced and arranged in a single row in the transverse channel between the pair of opposed side walls,
   wherein the pair of opposed side walls of the transverse channel are parallel,
   wherein each of the first pattern and the second pattern is a column-shaped three-dimensional structure having a polygonal transverse section,
   wherein the polygonal transverse section has at least one internal angle that is greater or less than 90°,
   wherein the first pattern and the second pattern are arranged in the transverse channel so as to have a shape of the transverse sections being rotated 180° relative to each other,
   wherein first spacing distances from each of the first pattern and the second pattern to a first side wall of the pair of opposed side walls of the transverse channel are different,
   wherein second spacing distances from each of the first pattern and the second pattern to a second side wall of the pair of opposed side walls of the transverse channel are different,
   wherein the first spacing distances and the second spacing distances of the first pattern are different from each other,
   wherein the first spacing distances and the second spacing distances of the second pattern are different from each other, and
   wherein the polygonal transverse section is a trapezoid.

2. The separator for a fuel cell of claim 1, wherein the flow channel is one or more types selected from among a serpentine-type, an interdigitated-type and a parallel-type.

3. A fuel cell comprising the separator for a fuel cell of claim 1.

* * * * *